US009102399B2

(12) United States Patent
Sahasrabudhe et al.

(10) Patent No.: US 9,102,399 B2
(45) Date of Patent: Aug. 11, 2015

(54) LIFE IMPROVING FLIGHT CONTROL SYSTEM

(75) Inventors: Vineet Sahasrabudhe, Cheshire, CT (US); Ole Wulff, Ansonia, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 1284 days.

(21) Appl. No.: 12/879,072

(22) Filed: Sep. 10, 2010

(65) Prior Publication Data

US 2011/0057071 A1  Mar. 10, 2011

Related U.S. Application Data

(60) Provisional application No. 61/241,048, filed on Sep. 10, 2009.

(51) Int. Cl.
| | | |
|---|---|---|
| *G05D 1/00* | (2006.01) | |
| *B64C 27/00* | (2006.01) | |
| *B64C 13/50* | (2006.01) | |
| *G05D 1/08* | (2006.01) | |
| *G05B 17/02* | (2006.01) | |
| *B64C 27/68* | (2006.01) | |

(52) U.S. Cl.
CPC ............ *B64C 13/503* (2013.01); *G05D 1/0858* (2013.01); *B64C 27/68* (2013.01); *G05B 17/02* (2013.01); *Y02T 50/44* (2013.01)

(58) Field of Classification Search
CPC ..... B64C 13/503; G05B 17/02; G05B 1/0858
USPC ......... 701/3, 14; 244/99.5, 227, 82, 223, 234, 244/236, 195, 17.25
See application file for complete search history.

(56) References Cited

U.S. PATENT DOCUMENTS

| | | |
|---|---|---|
| 4,173,322 A | 11/1979 | Macdonald |
| 4,420,808 A | 12/1983 | Diamond et al. |
| 4,483,498 A | 11/1984 | Boehringer |
| 4,699,043 A | 10/1987 | Violante De Dionigi |
| 4,744,532 A | 5/1988 | Ziegler et al. |
| 5,181,380 A | 1/1993 | Favre et al. |
| 5,217,189 A | 6/1993 | Sandage |
| 5,785,497 A | 7/1998 | White et al. |
| 5,806,805 A | 9/1998 | Elbert et al. |
| 5,881,971 A * | 3/1999 | Hickman ...................... 244/1 R |
| 6,012,676 A | 1/2000 | Gold et al. |
| 6,131,062 A | 10/2000 | Nielsen |
| 6,145,428 A | 11/2000 | Gold et al. |

(Continued)

FOREIGN PATENT DOCUMENTS

WO    2009/032386 A2    3/2009

OTHER PUBLICATIONS

European Search Report for EP Application No. 10174169.2 dated May 8, 2014.

*Primary Examiner* — Thomas G Black
*Assistant Examiner* — Wae Louie
(74) *Attorney, Agent, or Firm* — Carlson, Gaskey & Olds, P.C.

(57) ABSTRACT

A flight control system includes a command model modified in response to a Life Improving Control (LIC) algorithm. An inverse aircraft model is in communication with the command model to generate a flight control system command to command an aircraft state. A feedback path from the command model and the aircraft state is also modified in response to the Life Improving Control (LIC) algorithm.

15 Claims, 8 Drawing Sheets

(56) References Cited

U.S. PATENT DOCUMENTS

| | | |
|---|---|---|
| 6,189,836 B1 | 2/2001 | Gold et al. |
| 6,366,837 B1 | 4/2002 | Yount et al. |
| 6,443,399 B1 | 9/2002 | Yount et al. |
| 6,446,911 B1 | 9/2002 | Yount et al. |
| 6,561,463 B1 | 5/2003 | Yount et al. |
| 6,588,704 B2 | 7/2003 | Rodrigues |
| 6,644,332 B1 | 11/2003 | Winkler |
| 6,685,137 B2 | 2/2004 | Darbyshire |
| 6,693,399 B2 | 2/2004 | Silvestro |
| 6,772,074 B2 | 8/2004 | Millott et al. |
| 6,827,311 B2 * | 12/2004 | Wingett et al. ............. 244/99.5 |
| 6,856,920 B2 | 2/2005 | Millott et al. |
| 6,885,917 B2 * | 4/2005 | Osder et al. ...................... 701/3 |
| 7,098,619 B2 | 8/2006 | Stridsberg |
| 7,107,127 B2 | 9/2006 | Goodman |
| 7,175,133 B2 | 2/2007 | Tanaka et al. |
| 7,197,147 B2 | 3/2007 | Millott et al. |
| 7,211,982 B1 * | 5/2007 | Chang et al. ................... 318/636 |
| 7,246,769 B2 | 7/2007 | Yoeli |
| 7,275,712 B2 | 10/2007 | Yoeli |
| 7,449,858 B2 | 11/2008 | Chang et al. |
| 7,474,944 B2 | 1/2009 | Cartmell et al. |
| 7,970,498 B2 * | 6/2011 | Sahasrabudhe et al. .......... 701/3 |
| 8,032,269 B2 * | 10/2011 | Cherepinsky et al. .......... 701/14 |
| 8,231,085 B2 * | 7/2012 | Cherepinsky ................. 244/223 |
| 8,271,151 B2 * | 9/2012 | Hasan et al. ...................... 701/3 |
| 2006/0253230 A1 | 11/2006 | Fanciullo et al. |
| 2007/0168157 A1 * | 7/2007 | Khibnik et al. ................. 702/182 |
| 2008/0237392 A1 * | 10/2008 | Piasecki et al. ..................... 244/6 |
| 2009/0012658 A1 * | 1/2009 | Cherepinsky et al. ............. 701/3 |
| 2010/0017048 A1 * | 1/2010 | Sahasrabudhe et al. .......... 701/3 |
| 2010/0023186 A1 * | 1/2010 | Sahasrabudhe et al. .......... 701/3 |
| 2010/0145555 A1 * | 6/2010 | Hagerott et al. .................. 701/3 |
| 2011/0057071 A1 * | 3/2011 | Sahasrabudhe et al. ... 244/17.13 |
| 2012/0072056 A1 * | 3/2012 | Hasan et al. ....................... 701/3 |
| 2013/0166111 A1 * | 6/2013 | Ruckes et al. ..................... 701/3 |

\* cited by examiner

LIFE IMPROVING FLIGHT CONTROL SYSTEM

REFERENCE TO RELATED APPLICATION

The present disclosure claims priority to U.S. Provisional Patent Application No. 61/241,048, filed Sep. 10, 2009.

BACKGROUND

The present disclosure relates to a flight control system and more particularly to a Life Improving Control (LIC) algorithm to reduce flight loads and prolong rotary-wing aircraft component service life.

During flight operations the load bearing and load transmitting aircraft components may suffer damage due to high peak loads during aggressive maneuvers especially in combat situations.

Control algorithms to increase aircraft component life have commonly employed physics-based modeling for time-frequency damage classification. Such conventional damage models rely on design techniques whose applicability to rotary-wing aircraft flight control system design and implementation may be limited. There have been efforts to develop and analyze control algorithms to increase aircraft component life, however, the focus was on a particular component and based on a specific modern control theory design technique.

SUMMARY

A flight control system according to an exemplary aspect of the present disclosure includes a command model modified in response to Life Improving Control (LIC) algorithm. An inverse aircraft model is in communication with the command model to generate a flight control system command to command an aircraft state. A feedback path from the command model and the aircraft state is also modified in response to the Life Improving Control (LIC) algorithm.

A flight control system according to an exemplary aspect of the present disclosure includes a first flight control system a first level of agility and a first fatigue load application limit and a second flight control system which provides a second level of agility and a second fatigue load application limit. The second level of agility is less than the first level of agility and the second fatigue load application limit is less than the first fatigue load application limit.

A method of flight control according to an exemplary aspect of the present disclosure includes modifying a command model and a feedback path in communication with the command model in response to a Life Improving Control (LIC) algorithm to reduce fatigue loads applied to an aircraft flight critical component.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
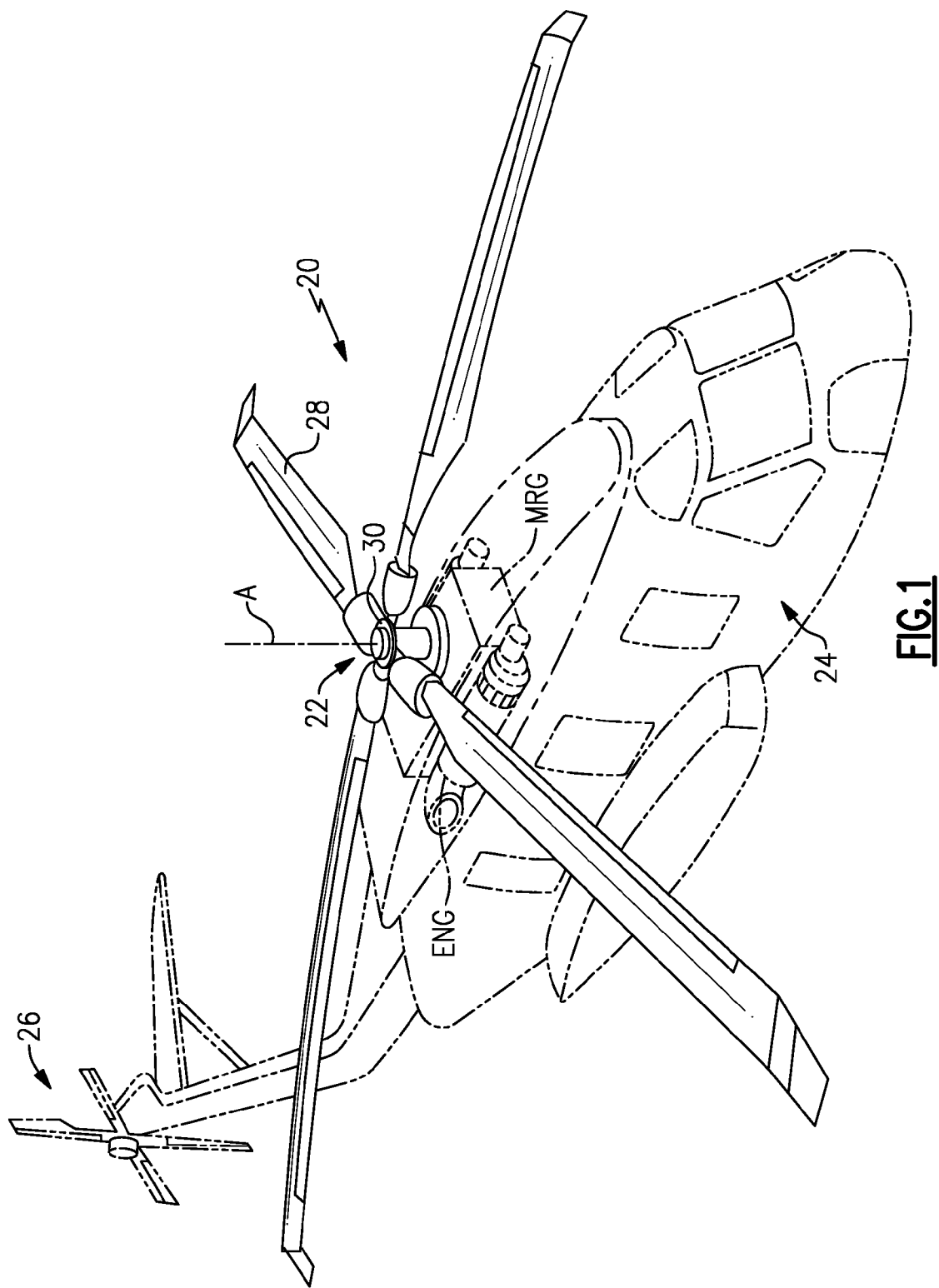
FIG. 1 is a perspective view of one exemplary rotary wing aircraft.

FIG. 1 schematically illustrates an exemplary vertical take-off and landing (VTOL) rotary-wing aircraft 20. The aircraft 20 in the disclosed, non-limiting embodiment includes a main rotor system 22 supported by an airframe 24 having an extending tail which mounts an anti-torque system 26 such as a tail rotor system. The main rotor system 22 is driven about an axis of rotation A through a main rotor gearbox MRG by one or more engines ENG. The main rotor gearbox MRG may be interposed between the one or more engines ENG, the main rotor system 22 and the anti-torque system 26. Although a particular helicopter configuration is illustrated and described in the disclosed embodiment, other configurations and/or machines, such as high speed compound rotary wing aircraft with supplemental translational thrust systems, dual contra-rotating, coaxial rotor system aircraft, turbo-props, tilt-rotors and tilt-wing aircraft, will also benefit from the present invention.

Figure 2A:
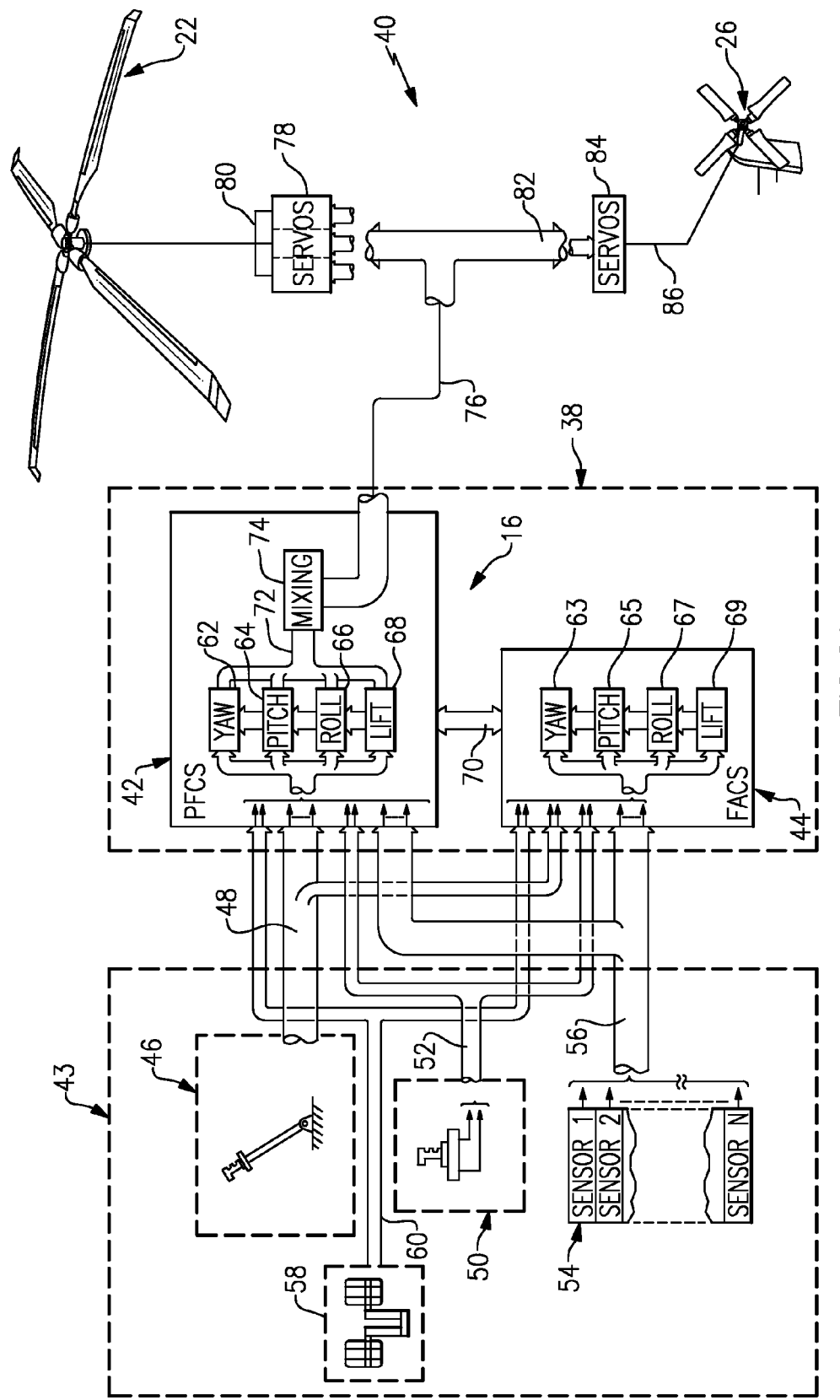
FIG. 2A is a block diagram of a non-limiting embodiment of an exemplary model following flight control system.

Referring to FIG. 2A, a fly-by-wire type flight control system (FCS) 40 includes a model following control which shapes cockpit controller displacement commands through an inverse vehicle model to produce the desired aircraft state. The FCS 40 may, in one non-limiting embodiment, include a Flight Control Computer (FCC) 38. The FCC 38 generally includes a Primary Flight Control System (PFCS) 42 and an Automatic Flight Augmentation and Cuing System (FACS) 44.

The PFCS 42 and FACS 44 receive the force output command signals from a collective controller 46 on line 48, a cyclic controller 50 on line 52, and the aircraft's sensed signals from sensor suite 54, on lines 56 and a yaw pedal controller 58 on lines 60. The cockpit controllers located in the cockpit of the aircraft 20 are operated manually by the aircrew and may take various forms including, but not limited to, collective stick systems, sidearm controller systems, yaw pedal systems or other such cockpit controllers. The collective controller 46, the cyclic controller 50, the aircraft's sensed signals from sensor suite 54 and the yaw pedal controller 58 may be jointly referred to as an Input Signal Management (ISM) system 43.

The PFCS 42 and FACS 44 may each contain separate flight control law logic models for controlling the yaw, pitch, roll and lift axes of the aircraft. The logic is included in PFCS and FACS logic modules (schematically represented by modules 62, 64, 66, 68 for the PFCS 42 and modules 63, 65, 67, 69 for the FACS 44). The sensed parameter signals from aircraft sensors suite 54, provide the PFCS 42 and FACS 44 with, for example, the aircraft's angular rate and attitude response. The control laws of the PFCS 42 are operable to execute an explicit model-following algorithm to provide a rate command/attitude hold (RC/AH) response in the pitch, roll and yaw axes. The PFCS 42 provides rotor command signals and the FACS 44 provides conditioning of the PFCS 42 four axis logic functions to provide, for example only, autopilot capabilities.

The PFCS 42 and FACS 44 logic modules are interconnected through bus 70 to provide flight control system commands on output lines 72 to a mixing function 74 which communicates the commands on lines 76 for the displacement of the main rotor servo system 78 and linkages 80 to control the main rotor system 22. A mixed command signal is also provided on line 82 to the tail rotor servo system 84 to control the thrust of the anti-torque system 26 through linkages 86. In a rotary-wing aircraft, the servo systems 78, 84 produce changes in hydraulic, electrical or mechanical actuation system that alter the magnitude of the flight control surfaces such as main rotor collective pitch, lateral cyclic pitch, longitudinal cyclic pitch, and tail rotor collective pitch. In a fixed wing aircraft, the servo system produce changes in hydraulic, electrical or mechanical actuation systems to manipulate flight control surfaces such as a rudder, elevators, flaperons, elevons, ailerons and others. The servo positions are reported back to the FCC for monitoring.

The PFCS 42 and FACS 44 execute explicit model following control laws to provide both control and stability augmentation. In this control law architecture, aircrew commands are shaped directly into desired aircraft responses. These desired commands are then passed through an inverse aircraft model to obtain the control commands required to produce the desired response. The difference between the desired command and the aircraft response is also fed back to drive these errors towards zero to improve the model following performance (see also FIG. 3).

Figure 2B:
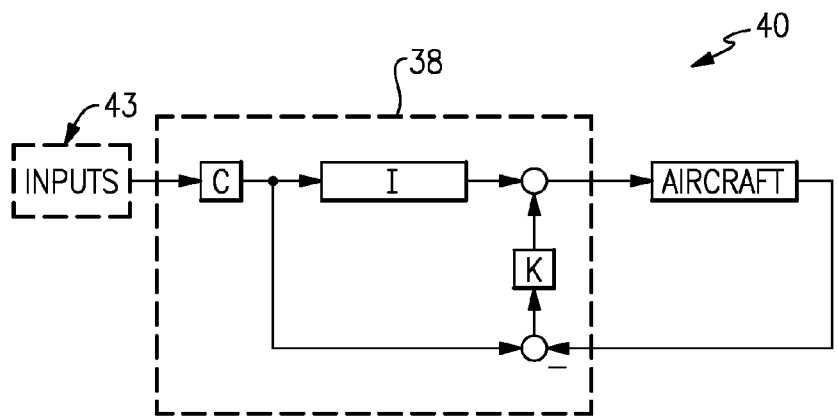
FIG. 2B is a block diagram of the integration of a fly-by-wire flight control system.

Referring to FIG. 2B, the FCS 40 is disclosed in terms of functional module diagrams, and it should be understood by those skilled in the art with the benefit of this disclosure that the functions may be enacted in either dedicated hardware circuitry or programmed software routines capable of execution in a microprocessor based electronics control embodiment. Although a multitude of functional modules are utilized within the PFCS 42, only the functional modules directly related to the disclosure will be discussed in detail herein.

The FCS 40 in this disclosed non-limiting embodiment is a model following system that includes a command model C, an inverse aircraft model I and feedback paths K. Aircrew inputs from, for example, the collective controller 46, the cyclic controller 50, the aircraft's sensed signals from the sensor suite 54 and the yaw pedal controller 58 (FIG. 2A) are shaped by the command model C to generate the desired aircraft state, which in this flight control embodiment are roll, pitch and yaw rate command signals. The command model C generally includes a filter function in pitch and roll with variable parameters that control the gain and bandwidth characteristics of the command model C. The command model C may also include acceleration limits to smooth aircrew inputs and limit main rotor system 22 and anti-torque system 26 moments. The command model C generates outputs which are commanded body-axis rates.

The inverse aircraft model I is a simplified model of the aircraft dynamics to calculate feed-forward canceller commands that are consistent with the command model C. The inverse aircraft model I generally operates to cancel inherent aircraft dynamics of the aircraft 20 with the objective to force the aircraft 20 to follow the rate command signals from the command model C. This is accomplished through communication of the rate command signals into the inverse aircraft model I to generate the appropriate flight control system commands to the main rotor system 22 and the anti-torque system 26 in the disclosed rotary-wing aircraft embodiment. The commanded rate is compared to the actual rate and the error is multiplied by a feedback gain within the feedback path K.

Feedback path K is implemented to, for example, account for inaccuracies of the inverse aircraft model I so as to, for example, stabilize the aircraft, improve aircraft agility qualities, and facilitate gust alleviation. The actual value of an aircraft state, for example, the aircraft pitch rate is subtracted from the commanded pitch rate and used within the feedback path K. The feedback control signal is input to the flight system control commands so as to minimize the deviation of the actual aircraft state from desired aircraft state.

Figure 2C:
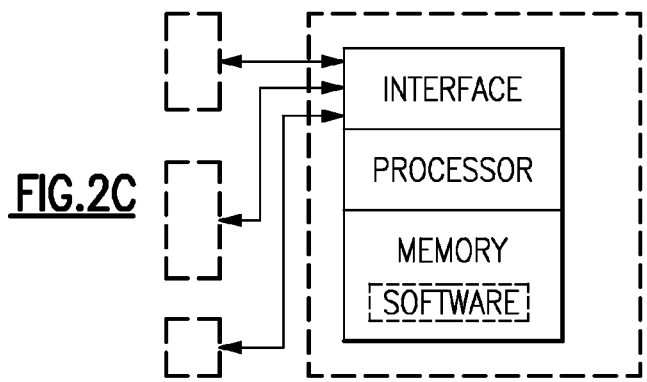
FIG. 2C is a schematic logic block diagram of a module which executes the fly-by-wire flight control system.

Referring to FIG. 2C, a module may define the FCC 38, to execute the command model C, an inverse aircraft model I and feedback paths, K. The functions of the FCC 38 disclosed in terms of blocks, and it should be understood by those skilled in the art with the benefit of this disclosure that these functions may be enacted in either dedicated hardware circuitry or programmed software routines capable of execution in a microprocessor based electronics control embodiment. The module may include a processor, a memory, and an interface. The processor may be any type of known microprocessor having desired performance characteristics. The memory may, for example only, includes UVPROM, EEPROM, FLASH, RAM, ROM, DVD, CD, a hard drive, or other computer readable medium which stores the data and control logic described herein. The interface facilitates communication with other avionics and systems as represented by other logic blocks.

Figure 3A:
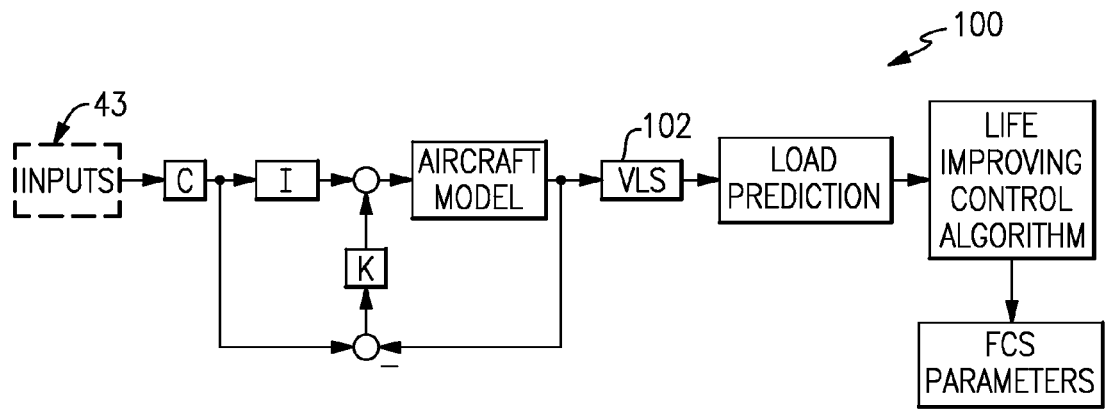
FIG. 3A is a schematic simulation model of a Flight control systems to study the effect of Life Improving Control algorithm.

Referring to FIG. 3, a simulation model 100 is assembled to develop FCS parameters modified by a Life Improving Control (LIC) algorithm. It should be noted that a computing device can be used to implement various functionality of the simulation model. In terms of hardware architecture, such a computing device can include a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The processor may be a hardware device for executing software, particularly software stored in memory. The processor can be a custom made or commercially available processor, a central processing unit (CPU), an auxiliary processor among several processors associated with the computing device, a semiconductor based microprocessor (in the form of a microchip or chip set) or generally any device for executing software instructions.

The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media.

Note that the memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The Input/Output devices that may be coupled to system I/O Interface(s) may include input devices, for example but not limited to, a keyboard, mouse, scanner, microphone, camera, proximity device, etc. Further, the Input/Output devices may also include output devices, for example but not limited to, a printer, display, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

When the computing device is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed.

Figure 4:
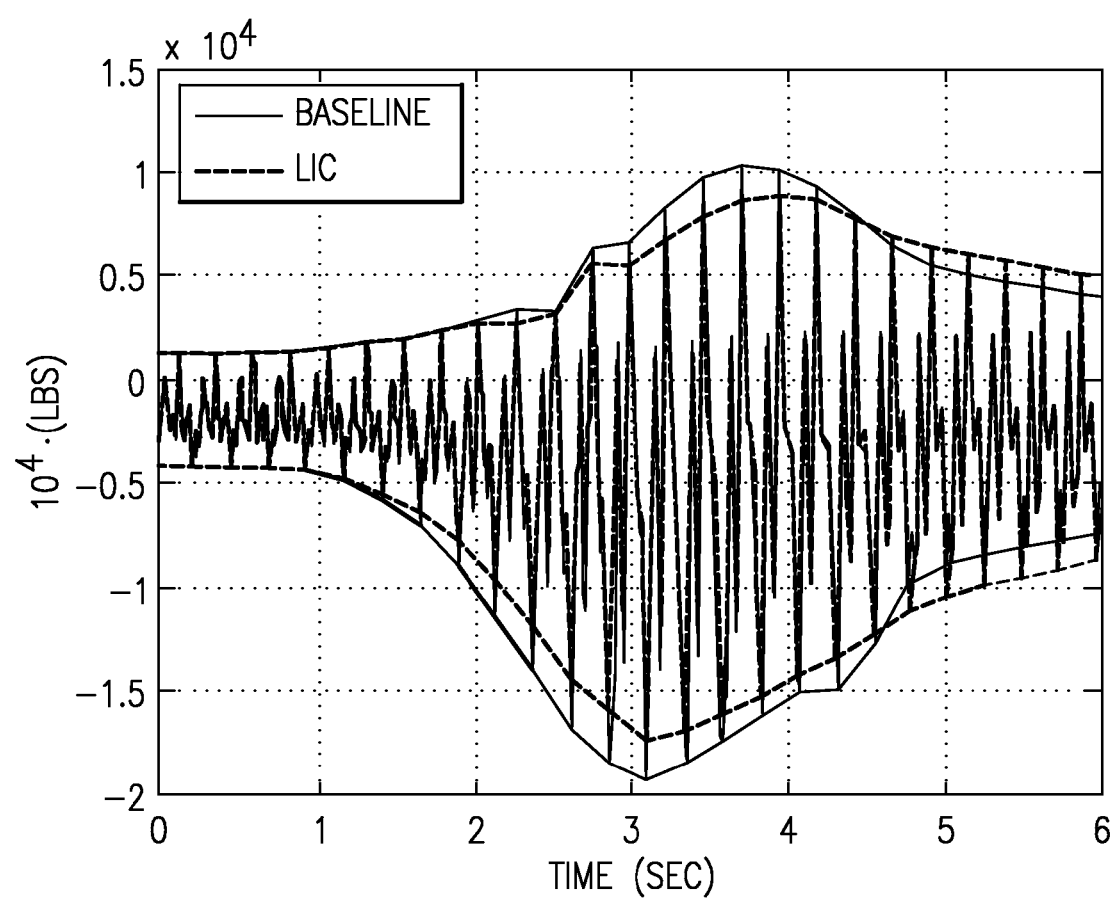
FIG. 4 is a comparison of the baseline load versus load reduction with a load envelope plotted versus time.

In the simulation model 100, a Virtual Load Sensor (VLS) model 102 is employed as a virtual sensor to estimate loads applied to flight critical components that may be otherwise expensive and complicated to instrument on an actual aircraft. The VLS model 102 operates to predict peak and fatigue loads applied to the flight critical components such as pitch links, swashplate components, and others in response to particular high load aircraft maneuvers. A Life Improving Control (LIC) algorithm may then be utilized with the VLS model 102 to estimate fatigue loads for a component life calculation to thereby determine the expected damage over the life of each flight critical component due to the fatigue loads. The VLS model 102 is a mathematical construct that estimates loads based on other available system states. The VLS model 102 is data driven by generally three input types such as, for example, aircrew inputs e.g. cockpit controller position, aircraft state e.g. aircraft attitude, aircraft rate; and external factors, e.g., aircraft weight as defined within the flight control system simulation model 104. The output of the VLS model 102 may be a waveform of the fatigue load from the flight control system simulation model 104 which may be computed based on linear algebraic methods (FIG. 4).

The simulation model 100 thereby facilitates identification of load reducing FCS parameters for the command model C and the feedback path K of the flight control system simulation model 104 for a respective aircraft maneuver. That is, the simulation model 100 is used to modify FCS parameters in the command model C and in the feedback path K for the flight control system simulation model 104 to reduce the fatigue loads during the respective aircraft maneuvers.

Figure 3B:
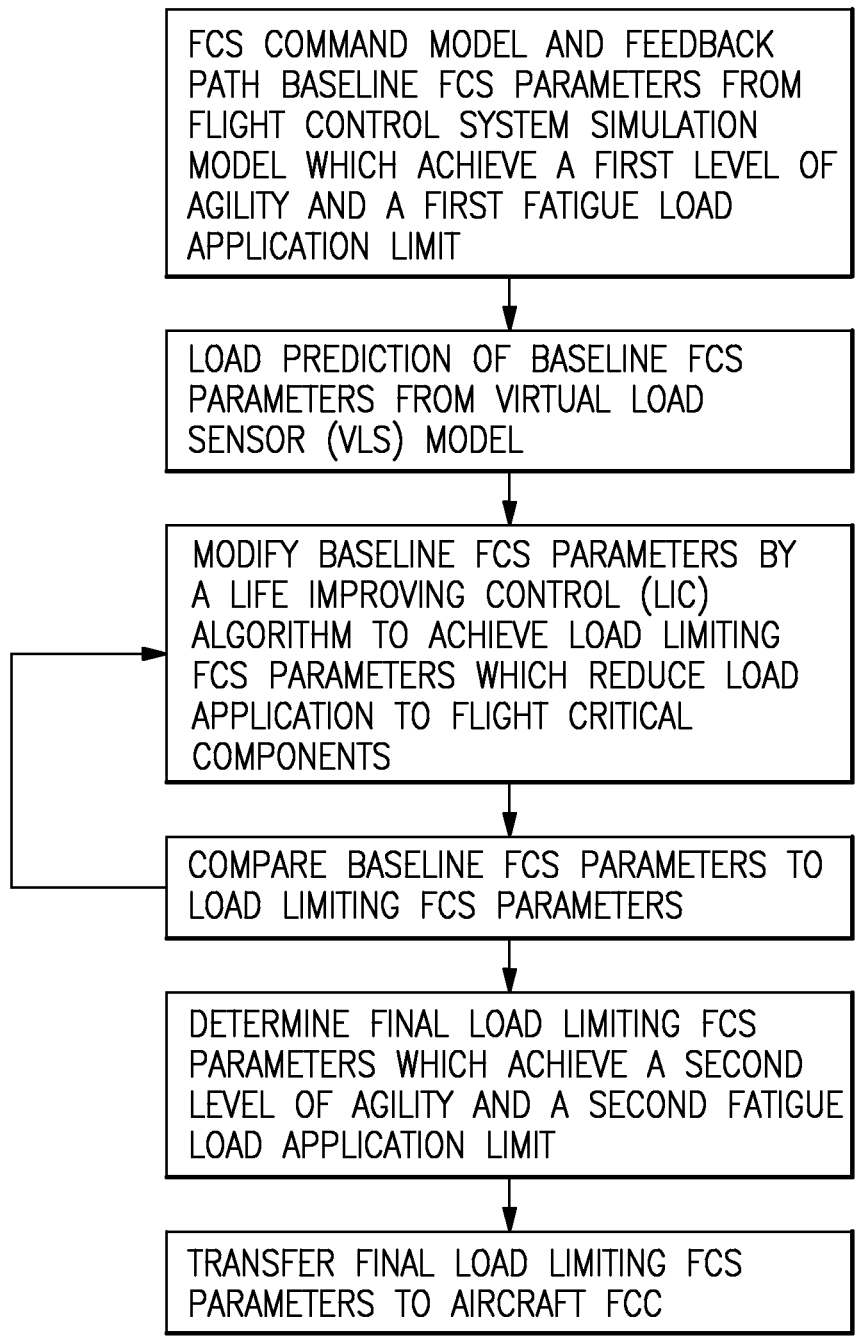
FIG. 3B is a flowchart of a Life Improving Control algorithm study.

In one operational example, nominal FCS parameters are first implemented within the command model C and the feedback path K within the flight control system simulation model 104 to obtain desired agility qualities. Then, a fatiguing maneuver caused by, for example aggressive aircrew inputs is simulated and the resultant fatigue load is defined as a baseline load. Next, the FCS parameters in the command model C and in the feedback path K are adjusted and the fatiguing maneuver simulation based on the same inputs is repeated. The resultant fatigue loads are compared against the baseline loads to determine the quantity of fatigue load reduction (FIG. 3B). By repeated modification of the FCS parameter values within the flight control system simulation model 104 in an interactive manner to simulate the fatigue load response for comparison against the baseline, insight is gained into the qualitative and quantitative load reducing effect of the respective FCS parameters with the VLS model 102. The resultant modified FCS parameters are essentially the baseline FCS parameters as modified by the LIC algorithm.

For further understanding of other aspects of an example of the Virtual Load Sensor model 102 and associated operations thereof, attention is directed to United States Patent Publication No. 2007/0168157 which is assigned to the assignee of the instant application and which is hereby incorporated herein in its entirety.

Referring to FIG. 4, a comparison of a baseline load against a load reduction as modified by the LIC algorithm is illustrated where an estimated load, along with a load envelope, is plotted versus time for a particular maneuver. The baseline load and the load reduction as modified by the LIC algorithm may be determined for each of a multiple of flight critical components such as a pitch link, swashplate components and other flight critical components so as to determine the FCS parameters as adapted by the LIC algorithm to reduce loads thereon. The solid line represents the baseline fatigue load from baseline FCS parameters and the broken line represents the reduced loads from the load limiting FCS parameters as adapted by the Life Improving Control (LIC) algorithm.

The FCS parameters from the LIC algorithm yield a smoother load transient than the baseline FCS parameters to reduce the peak fatigue loads. In this example, at 3.1 seconds and 3.7 seconds, the baseline FCS parameters results in values of approximately 19,3000 lbs and 10,400 lbs, respectively. The FCS parameters as adapted by the LIC algorithm, however, results in load values at 3.1 and 3.9 seconds of approximately 17,200 lbs and 8,900. While the baseline FCS parameters gives a peak-to-peak load of 29,700 lbs, the FCS parameters as adapted by the LIC algorithm yields 26,100 lbs. The load difference is approximately 3,600 lbs, or about 12% of the baseline load.

Application of the LIC algorithm to obtain the load reducing FCS parameters modified by the LIC algorithm different than the FCS parameters in the baseline FCS 40 will thereby extend component life through the reduction of peak and fatigue loads. Since lesser loads are applied to the flight critical components, the flight critical components may alternatively be designed for the lesser loads to reduce the weight thereof.

Rather than modern control design methods, the Life Improving Control (LIC) algorithm is based on an already developed Fly-By-Wire (FBW) FCS. Also, instead of a physical model, an empirical VLS model based on flight test data is employed to estimate aircraft component life fatigue.

Figure 5:
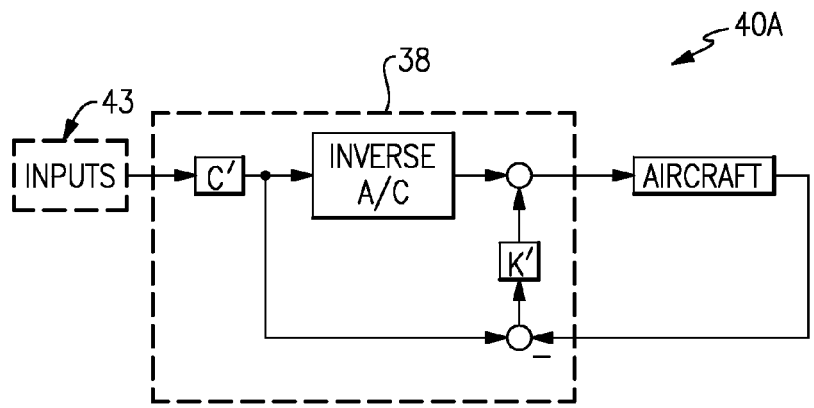
FIG. 5 is a schematic block diagram of a module to execute Life Improving Control (LIC) algorithm within a flight control system.

Referring to FIG. 5, one embodiment of the FCS 40 includes a Single Static FCS 40A in which FCS parameters modified by the LIC algorithm are implemented in a command model C' and a feedback path K'. Based on the load reduction study described above with regard to the Utilization Based Life Extension (VLS) simulation and the load limiting FCS parameters are transferred to the aircraft to provide the FCS 40A implementation. In this embodiment, the Life Improving Control parameters are static with respect to flight loads i.e. the parameters once utilized to modify or tune the Command model C' and feedback paths K' are not changed. The aircraft will therefore always perform maneuvers which are modified so as to reduce the fatigue load during the respective maneuvers. The Command model C' and feedback paths K' are tuned, however, so as to not unduly affect the agility of the aircraft 20. That is, the Command model C' and feedback path K' are configured to reduce the fatigue load with but minimal effect on aircraft agility in a tradeoff type relationship. In other words, the aggressive performance of the respective maneuvers may be slightly less than baseline (FIG. 2C) but the fatigue load therefrom is also reduced. The FCS 40A may be tailored for desired aircraft operations such as commercial, civil, military, etc.

Figure 6:
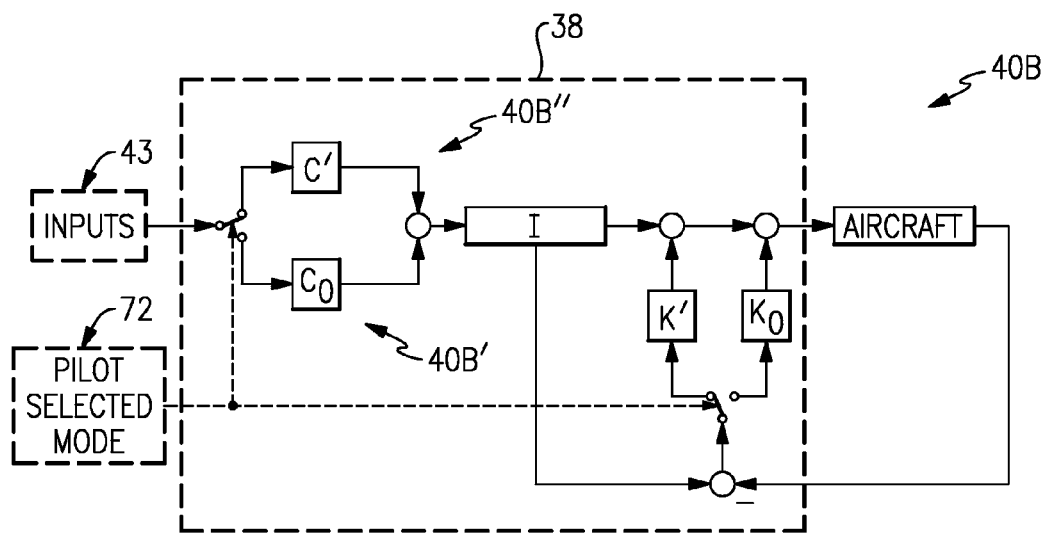
FIG. 6 is a schematic block diagram of a flight control system with one embodiment of Life Improving Control (LIC) algorithm.

Referring to FIG. 6, another embodiment provides a dual static FCS 40B. In general, two flight control systems 40B' and 40B" are both implemented on the aircraft 20. The first FCS 40B' represents the baseline FCS with corresponding FCS parameters within the command model $C_0$ and feedback path $K_0$ that is used by the aircrew to achieve the baseline level of agility. The command model $C_0$ and the controller $K_0$ are tuned as discussed in the case of the Single Static LIC algorithm above. For example, the baseline level of agility may be a "Combat Mode" which permits full maneuverability. The second FCS 40B" is a static system generally in accords with the Single Static FCS as discussed above. The second FCS 40B" is selected by the aircrew through a mode selector 72 when no aggressive maneuverability is expected. For example, the second static FCS 40B' may be tuned for a "Ferry Mode" which limits the maneuverability of the aircraft 20 as discussed with respect to FIG. 5. Notably, the "Ferry Mode" may significantly limit the agility of the aircraft to significantly minimize the loads. The aircrew selects which mode is most appropriate for the mission.

Figure 7:
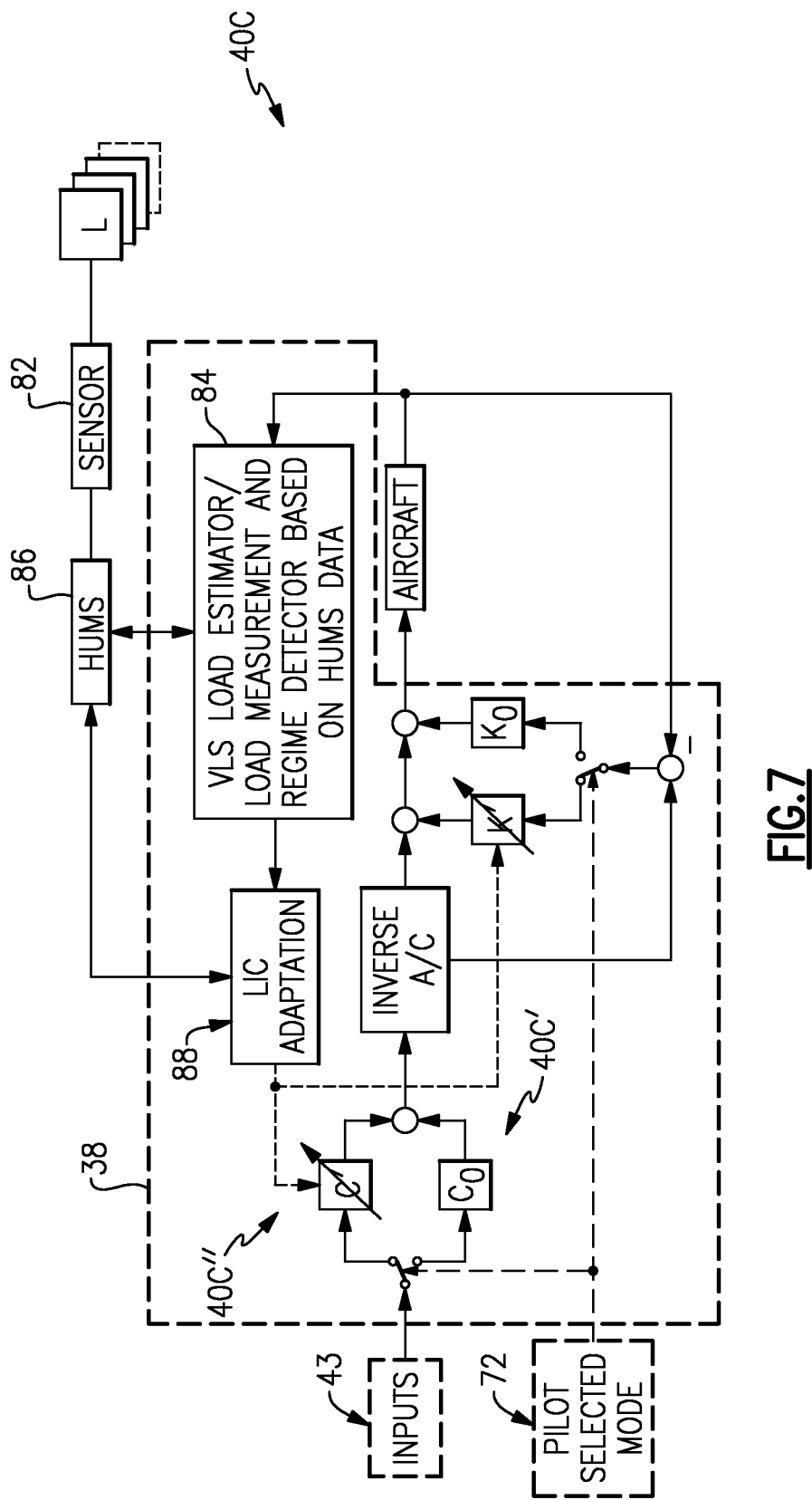
FIG. 7 is a schematic block diagram of a flight control system with another embodiment of Life Improving Control (LIC) algorithm.

Referring to FIG. 7, another embodiment provides a Dual Adaptive FCS 40C. In general, two flight control systems 40C' and 40C" are implemented on the aircraft 20. The first FCS 40C' represents the baseline FCS that is used by the aircrew to achieve the baseline level of agility as discussed above with respect to FIG. 6.

The second adaptive flight control system 40C" is a control system which adaptively limits the maneuverability of the aircraft 20. The aircrew selects which mode is most appropriate for the mission.

The "Non-Combat" Mode may adaptively limit the agility of the aircraft to minimize the agility just enough to the avoid peak loads. As defined herein, "Non-Combat" Mode may be considered to provide greater agility than the "Ferry" Mode but that which may subject the flight critical components to somewhat greater loads. For example, if the aircrew performs a maneuver that may potentially cause damage such that the measured or estimated load to be applied to the flight critical component is to exceed predefined thresholds, the parameters within the command model C' and feedback path K' are adaptively modified such that the resultant loads are reduced.

The measured or estimated load to be applied to a flight critical component L may be obtained from direct measurement through a sensor system 82. Alternatively, or in addition thereto, a VLS based load estimator 84 estimates the loads on the flight critical component L. The sensor system 82 and the VLS based load estimator 84 may be in communication with a Health and Usage Monitoring System (HUMS) 86 which is commonly incorporated within the aircraft 20. The FCS parameters within the command model C' and the feedback path K' may thereby be adaptively adjusted by a LIC module 88 which receives data from the VLS based load estimator 84 and the HUMS 86.

Figure 8:
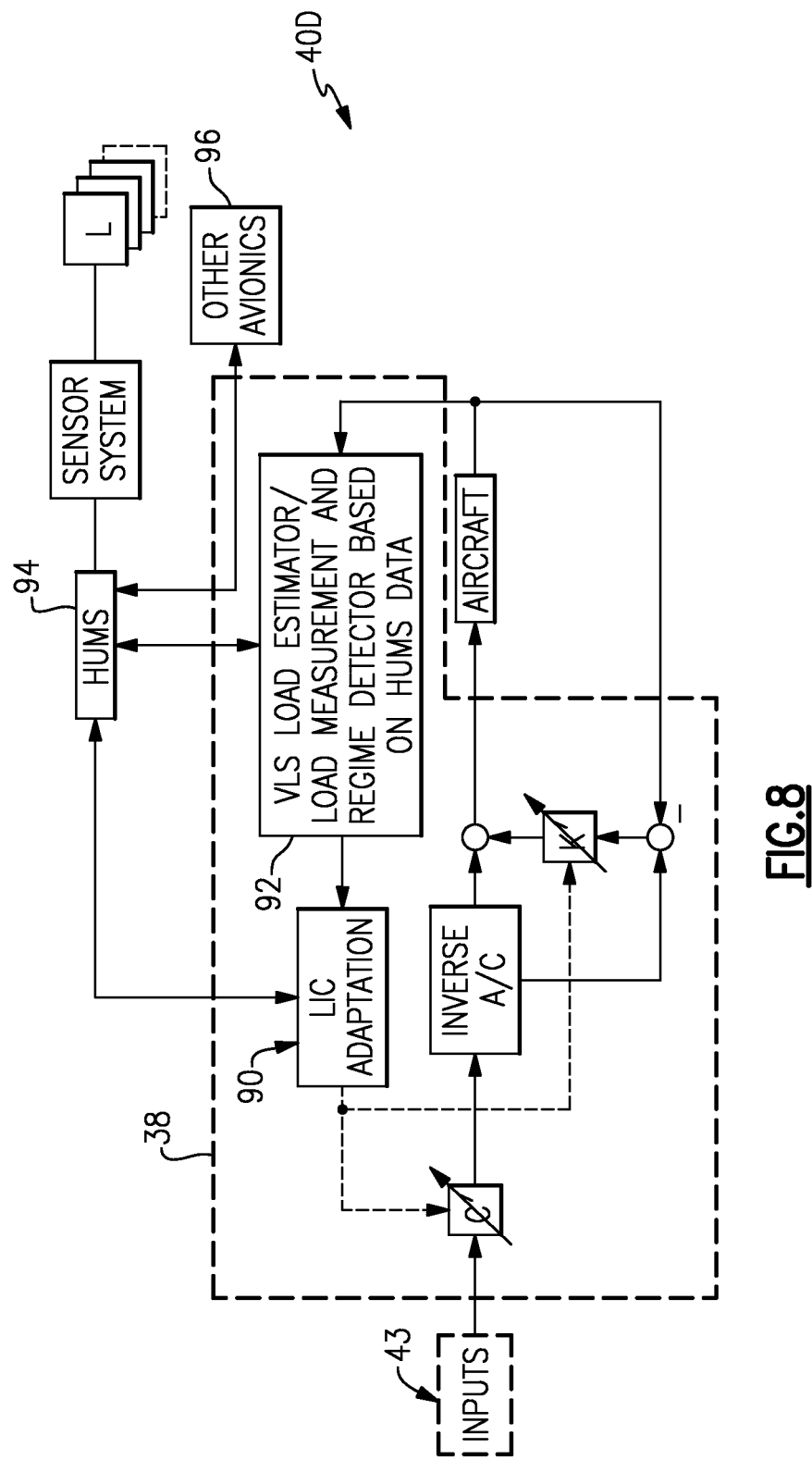
FIG. 8 is a schematic block diagram of a flight control system with another embodiment of Life Improving Control (LIC) algorithm.

Referring to FIG. 8, another embodiment provides a Single Adaptive FCS 40D. The flight control system 40D is a completely load adaptive control system which is adaptively configured to reduce the fatigue load with but minimal effect on the aircraft agility. In this non-limiting embodiment, a Single Adaptive LIC module 90 communicates with a VLS based load estimator 92 and a Health and Usage Monitoring System (HUMS) 94 generally as discussed above with respect to FIG. 7. The Single Adaptive LIC module 90, however, also operates to interpret an aircraft flight mode from the data being recorded by the HUMS 94 as well as other avionic systems 96.

An aircraft flight mode such as "Combat", "Non-Combat", "Ferry", etc may, in one non-limiting embodiment be determined through, for example, the series of maneuvers performed by the aircraft, aircraft parameters, aircraft load, the location of the aircraft and other conditions as well as various combinations thereof. That is, the Single Adaptive LIC module 90 essentially determines the tradeoff between the minimization of damaging load application and the effect upon flight agility qualities.

In one example, the HUMS 94 may identify a series of maneuvers performed which suggest a particular aircraft flight mode such as combat conditions combined with the location of the aircraft within a combat zone to select the LIC parameter set to adaptively maximize the damaging loads which may be applied to the aircraft 20 to maintain full flight agility. In another example, the HUMS 94 may identify a series of maneuvers performed which suggest a ferry flight mode with the location of the aircraft being over water to select the LIC parameter set to adaptively minimize the damaging loads which may be applied to the aircraft 20 with the tradeoff of minimal agility capability.

The present application provides a LIC that alleviates flight loads to improve component life, moreover is based on already developed Fly-By-Wire (FBW) flight control systems which yield satisfactory handling qualities. In addition, unlike physics based models, the current disclosure uses an innovative Virtual Load Sensor (VLS) based approach which provides greater flexibility.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A flight control system comprising:
a command model modified in response to a Life Improving Control (LIC) algorithm;
an inverse aircraft model in communication with said command model to generate a flight control system command to command an aircraft state; and
a feedback path from said command model and said aircraft state, said feedback path in communication with said flight control system command, said feedback path modified in response to said Life Improving Control (LIC) algorithm, wherein said Life Improving Control (LIC) algorithm is configured to modify the command model to reduce fatigue loads applied to an aircraft component in response to an aircraft maneuver.

2. The system as recited in claim 1, wherein said Life Improving Control (LIC) algorithm is configured to reduce fatigue loads applied to a pitch link, a component of a squash plate, or both, in response to an aircraft maneuver.

3. The system as recited in claim 1, wherein said Life Improving Control (LIC) algorithm is configured to reduce peak loads applied to an aircraft component in response to an aircraft maneuver.

4. The system as recited in claim 1, wherein a set of flight control system (FCS) parameters in a command model and in a feedback path within a simulation of said flight control system are adjusted in an iterative process, said set of FCS parameters utilized to modify said command model and said feedback path, wherein said set of FCS parameters generate a desired aircraft state in response to aircrew inputs.

5. The system as recited in claim 4, wherein said set of FCS parameters are static.

6. The system as recited in claim 1, further comprising a baseline flight control system to achieve a baseline level of agility, said baseline flight control system comprises:
a baseline command model;
a baseline inverse aircraft model in communication with said baseline command model to generate a baseline flight control system command to command said aircraft state; and
a baseline feedback path from said baseline command model and said aircraft state, said baseline feedback path in communication with said flight control system command, said baseline flight control system operable to achieve a first level of agility and a first fatigue load application limit, said command model modified in response to said Life Improving Control (LIC) algorithm and said feedback path modified in response to said Life Improving Control (LIC) algorithm operable to achieve a second level of agility and a second fatigue load application limit, said second level of agility less than said first level of agility and said second fatigue load application limit less than said first fatigue load application limit.

7. The system as recited in claim 5, wherein said baseline flight control system is aircrew selectable.

8. The system as recited in claim 7, wherein said Life Improving Control (LIC) algorithm is adaptive.

9. The system as recited in claim 8, wherein said Life Improving Control (LIC) algorithm is adaptive in response to a Health and Usage Monitoring System (HUMS).

10. The system as recited in claim 1, wherein said Life Improving Control (LIC) algorithm is adaptive in response to a Health and Usage Monitoring System (HUMS).

11. The system as recited in claim 1, wherein said Life Improving Control (LIC) algorithm is configured to modify the command model to alter commands sent from said command model to an aircraft component, the commands altered to reduce fatigue loads applied to said aircraft component in response to an aircraft maneuver.

12. A method of flight control comprising:
generating a flight control system command to command an aircraft state using an inverse aircraft model in communication with a command model; and
modifying the command model and a feedback path in communication with the command model in response to a Life Improving Control (LIC) algorithm, the Life Improving Control (LIC) algorithm to reduce fatigue loads applied to at least one aircraft component, the feedback path communicating with the flight control system command.

13. A method as recited in claim 12, wherein modifying the command model and the feedback path is adaptively performed.

14. A method as recited in claim 12, wherein modifying the command model and the feedback path is aircrew selectable.

15. A method as recited in claim 12, wherein the Life Improving Control (LIC) algorithm modifies the command model to alter commands sent from the command model to the at least one aircraft component, the Life Improving Control (LIC) algorithm altering the commands to reduce fatigue loads applied to said aircraft component in response to an aircraft maneuver.

* * * * *